3 Sheets—Sheet 1.

T. D. BURRALL.

Grain Harvester.

No. 695.

Reissued April 26, 1859.

WITNESSES

Geo B Disinberro

W D Burrall

INVENTOR

Thomas D Burrall

N. PETERS, Photo Lithographer, Washington, D. C.

3 Sheets—Sheet 2.

T. D. BURRALL.

Grain Harvester.

No. 695.

Reissued April 26, 1859.

Witnesses
Geo B Dusenbery
H D Burrall

Inventor
Thomas D Burrall

N. PETERS, Photo-Lithographer, Washington, D. C.

3 Sheets—Sheet 3.
T. D. BURRALL.
Grain Harvester.
No. 695.
Reissued April 26, 1859.
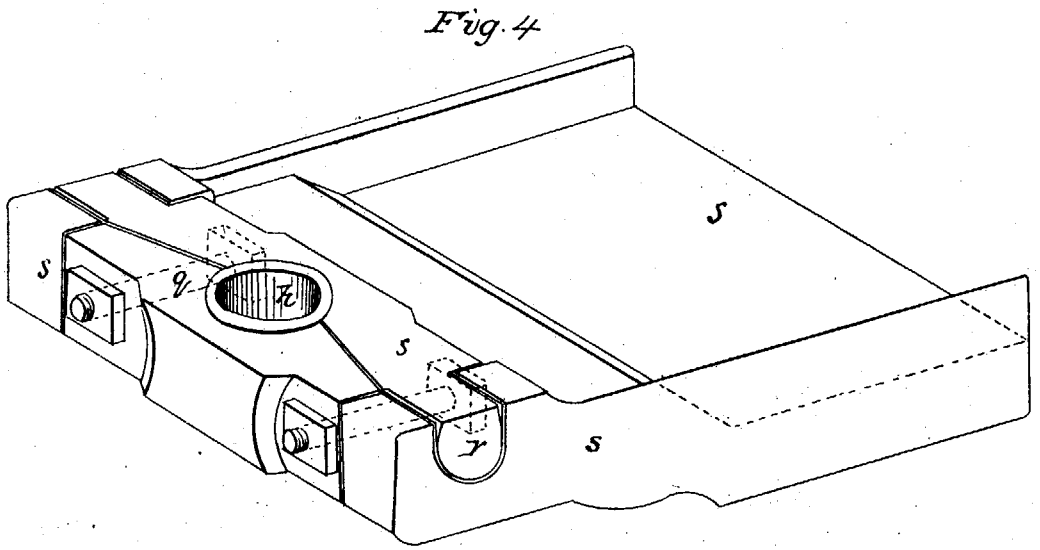
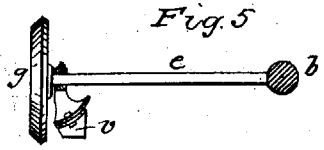
Witnesses
Geo. B. Dusenbery
W. B. Burrall
Inventor
Thomas D. Burrall
N. PETERS. Photo-Lithographer, Washington, D. C.

UNITED STATES PATENT OFFICE.

THOMAS D. BURRALL, OF GENEVA, NEW YORK.

IMPROVEMENT IN GRAIN-HARVESTERS.

Specification forming part of Letters Patent No. 9,644, dated April 5, 1853; Reissue No. 695, dated April 26, 1859.

DIVISION A.

*To all whom it may concern:*

Be it known that I, THOMAS D. BURRALL, of Geneva, in the county of Ontario and State of New York, have invented certain new and useful Improvements in Grain-Reapers, of which the following is a full and exact description.

My reaper, which I style a "convertible reaper," consists of a strong wooden frame or apron, say, five feet long and three and a half feet wide, its front edge being formed of a two-inch plank of hard wood, say, eight inches wide, and extended about three feet on one side, beyond that part of the apron on which the grain falls, to make room for the raker's seat, and to attach the apron to the frame of the driving-wheel and gearing, which frame may be of any suitable form to hold the gearings. To the front end of this frame is attached a perch or pole five or six feet long, the fore end of it resting on the axle-tree of a two-wheeled carriage drawn by horses; or the pole may be extended to a sufficient length and the team attached directly to it without the carriage. To the front end of the apron or finger-board I fasten cutter-guards, of iron, through slots in which the cutter works. The cutter consists of steel plates ground to an edge on two sides—say five inches long and three inches wide at the base, tapering to a point—riveted to an iron bar, which receives a reciprocating or vibrating motion from the main wheel by means of cog-gearings working a crank and pitman connected with the end of the bar.

Figure 1:
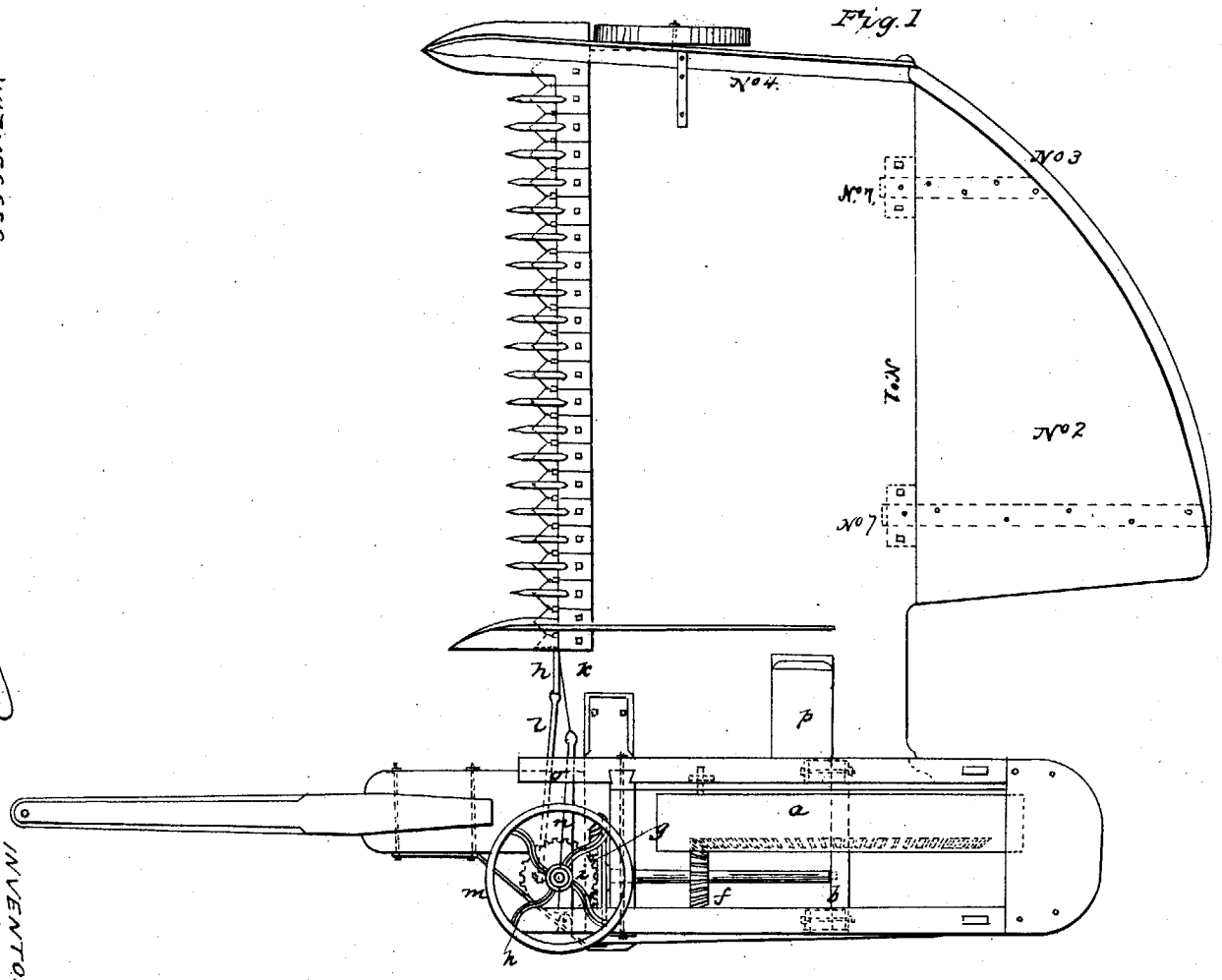
Figure 2:
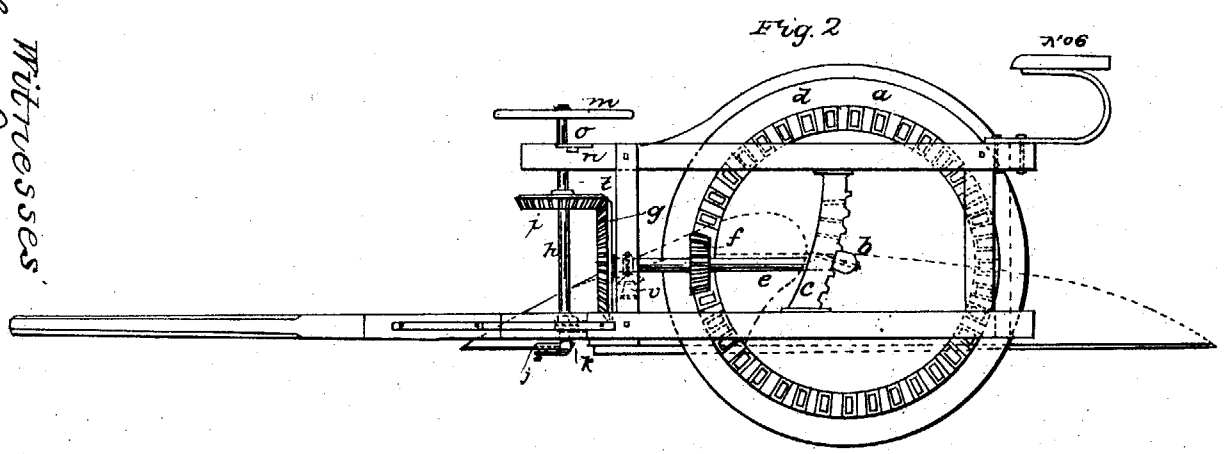
Figure 3:
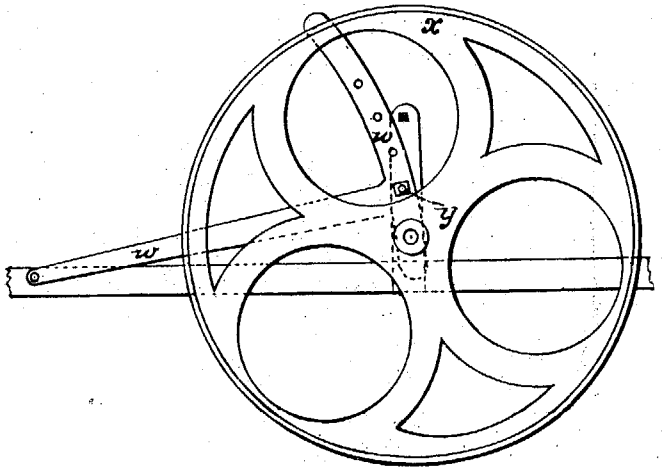

In the drawings annexed, Figure 2 is a side view of the machine. Fig. 1 is a plane projection or bird's-eye view of the same; Fig. 4, the bed-piece and movable box which holds the lower end of the crank-shaft, in perspective; Fig. 3, a side view of the small wheel and sector attached to the outer side of this apron.

My driving-gear consists of a strong wheel, of wood or iron, *a*, from three to three and a half feet in diameter, and from six to seven inches tread, rotating on an iron shaft or axle, *b*, firmly bolted at each end to iron posts *c*, which form a part of the frame above mentioned. Attached to the arms of the driving-wheel is a bevel-wheel, *d*, from twenty to thirty inches in diameter, driving a horizontal shaft, *e*, by means of a pinion, *f*, the back journal of which is stepped into a box on the main shaft, and the front end is held by the neck in a movable box, which will be described hereinafter. On the front end of this shaft is a bevel-wheel, *g*, from twelve to sixteen inches in diameter, driving a perpendicular shaft, *h*, by a pinion, *i*. The lower end of this shaft forms a crank, *j*, giving motion to the cutter-bar *k* by means of a pitman or connecting-rod, *l*. On the top of this shaft is a balance-wheel, *m*, which by its compensating-power gives an equable motion and relieves the machine from the jerk of the crank *j*. In addition to this use, the balance-wheel, as arranged, forms a convenient lever for turning the wheels for oiling, or for moving the machine for other purposes.

In order to throw the machine out of gear when required, the upper journal of the crank-shaft is secured by a box to a lever, *n*, extended across the front of the frame, one end of the lever hinging on a bolt or joint and the other playing in a slot and held in place by a shifting pin, *o*, the end forming a convenient handle by which it can be thrown in or out of gear by the raker, who sits upon a seat, *p*, just behind it. This raker's seat *p* is so arranged and located that the occupant can reach into the standing grain with his rake, and, when tangled, draw it to the cutters, and by the same or a succeeding operation, and by an easy and natural quarter-turn of his rake, deliver it onto the ground. In order to render the lower end of this shaft *h* movable and yet secure, the neck is held in a movable box, *q*, having a journal, *r*, at each end of the box, resting in corresponding sockets in a cast-iron bed-piece, *s*, which is bolted to the finger-board. In this way it is held firmly, while it shifts freely.

In order to adjust the cutting-edge to the various heights required, the rear sides of the iron posts before mentioned, to which the ends of the axle of the main wheel are bolted, are so shaped as to form segments of a circle the center of which, *t*, is at the point of contact of the pitch-circles of the front wheels, *g*, and pinion *i*, that when the main shaft *b* is bolted, at any height required, upon the post *c*, carrying the hind end of the second shaft along with it, the front wheel and pinion be kept in mesh; but to do this two things are necessary: first, that the teeth in the wheel and pinion have a convex face; and, secondly, that the neck of the horizontal shaft E be held in a movable or sliding box, *u*, suitably adjusted, the bottom of which forming the segment of a circle, the center of which, *t*, is formed in the same point as that of the circle on the posts *c*—to wit, the point of contact of the pitch-circle of the front wheel and pinion. This box is held in place, when adjusted, by a screw-bolt passing through a bridge-tree, *v*, on which it rests.

To regulate the height of the outer end of the apron, I use a sector of cast-iron, *w*, Fig. 3, having a radius of about fifteen inches, with an arm or axle (for a wheel of about sixteen inches diameter) on the lower end of the segment, by means of which the wheel is raised or lowered, and it is held in place by a bolt, *y*, through a corresponding plate attached to the frame or apron and to the dividing-board.

In the machine as above described the grain is discharged in the rear. To render it convertible, so as to discharge the grain at the side, if preferred, I attach to the rear of the apron 1, Fig. 1, as described, an extra apron, 2, having a curved back, 3, about twelve inches high, which forms a continuation or extension of the dividing-board 4, which separates the cut from the uncut grain. This apron extends back about three feet on the side next the raker, and is so shaped (forming nearly the segment of a circle) as to enable him, by a gentle sweep of his rake, to lay the grain directly in rear of the driving-wheel. The apron is attached by screw-bolts 7 through arms underneath to the main apron No. 1, and may be removed at pleasure. Again, it has been found on trial that in cutting damp grain of some kinds the cutter is liable to clog by the lodgment of small fibers of straw and fine grass in the cavities of the guards, as described. Several modes of remedying this difficulty have been devised and patented. In one the guards are left open on the top of the cutter-bar to let the fine grass pass off. In another a hole is made through the teeth. Both answer the purpose; but the one weakens the guards, the other the teeth. My mode is to cut a notch, 5, from the back corners of each knife—say three-fourths of an inch long and one-fourth wide—(and also notches may be cut on the front edge of the cutter-bar, four to six inches apart,) which does the work better and weakens nothing; or the teeth may be set about a quarter of an inch apart, so as to leave a space between them. This answers the same purpose, though not as neatly. Again, when my machine is drawn by attaching the team directly to the pole, I place a seat for the driver, 6, Fig. 2, on the hinder part of the frame, back of the wheel, so as to counterbalance the weight of the forward part of the machine, thus giving the choice of driving with a carriage or without, as preferred.

The mode of operating my machine and the use and advantages of my improvements are obvious on inspection.

A good grain-reaper should possess the following requisites: First, it should cut the grain without clogging; second, the cutting-edge should be easily adjusted to cut at the various heights required and be thrown out of gear at pleasure; third, it should lay the grain neatly for binding, in the most convenient manner, at the least labor of men and team. The first of these requirements is obtained in a very perfect manner by the notches in the back corners of the teeth of the knives, as described. In mine the apparatus described for varying the height of the cut and that for throwing the working parts out of gear answers the second purpose stated. Thirdly, to discharge the grain from the apron, the most easy and convenient mode, doubtless, is to slide it off directly in the rear (as is done by Hussey's reaper) wherever the grain is fit to bind and men are at hand to take it up; but when the grain is too wet or green to bind, or hands are wanting to do the work in time, it becomes necessary to discharge the grain at the side and far enough removed from the standing grain to leave room for the team and machine to pass for the next swath without treading on the grain. In this respect McCormick's "Virginia Reaper" has had an advantage over Hussey's in popular estimation. Both these modes are effected by my convertible reaper. Without the extra apron for side raking it discharges the grain in the rear as well as Hussey's, with it at the side, far better than McCormick's, inasmuch as it leaves the grain in better condition for drying and binding, and this, too, with much less labor to the raker, as he is conveniently seated at the center of motion for raking and passes the grain from the aprons by an easy quarter-turn movement of his rake, while in McCormick's, from the position of the raker on the extreme end of the finger-board, it requires the strength of a powerful man to discharge the sheaf and a good deal of practice to lay it in order fit for binding.

Having thus fully described the nature and object of my invention, what I claim therein as new, and desire to secure by Letters Patent, is—

1. The additional apron to convert the usual rear discharge into a side discharge of the cut grain, substantially as herein described.

2. The combination of the curved supports and the adjustable journal-box piece to preserve the relative positions of the cogs in the miter-gearing, and at the same time allow of raising and depressing the driving-wheel, substantially as described.

3. The notches in the back corners of each knife to prevent clogging or lodgment of fine grass in the cavities of the guards, said notches effecting a good purpose and not weakening the cutter, as herein represented.

THOMAS D. BURRALL.

Witnesses:
GEO. B. DUSINBERRE,
W. D. BURRALL.